March 11, 1930.  S. B. WINN  1,750,449
HAND BRAKE LEVER ASSEMBLY
Filed July 9, 1928   3 Sheets-Sheet 1
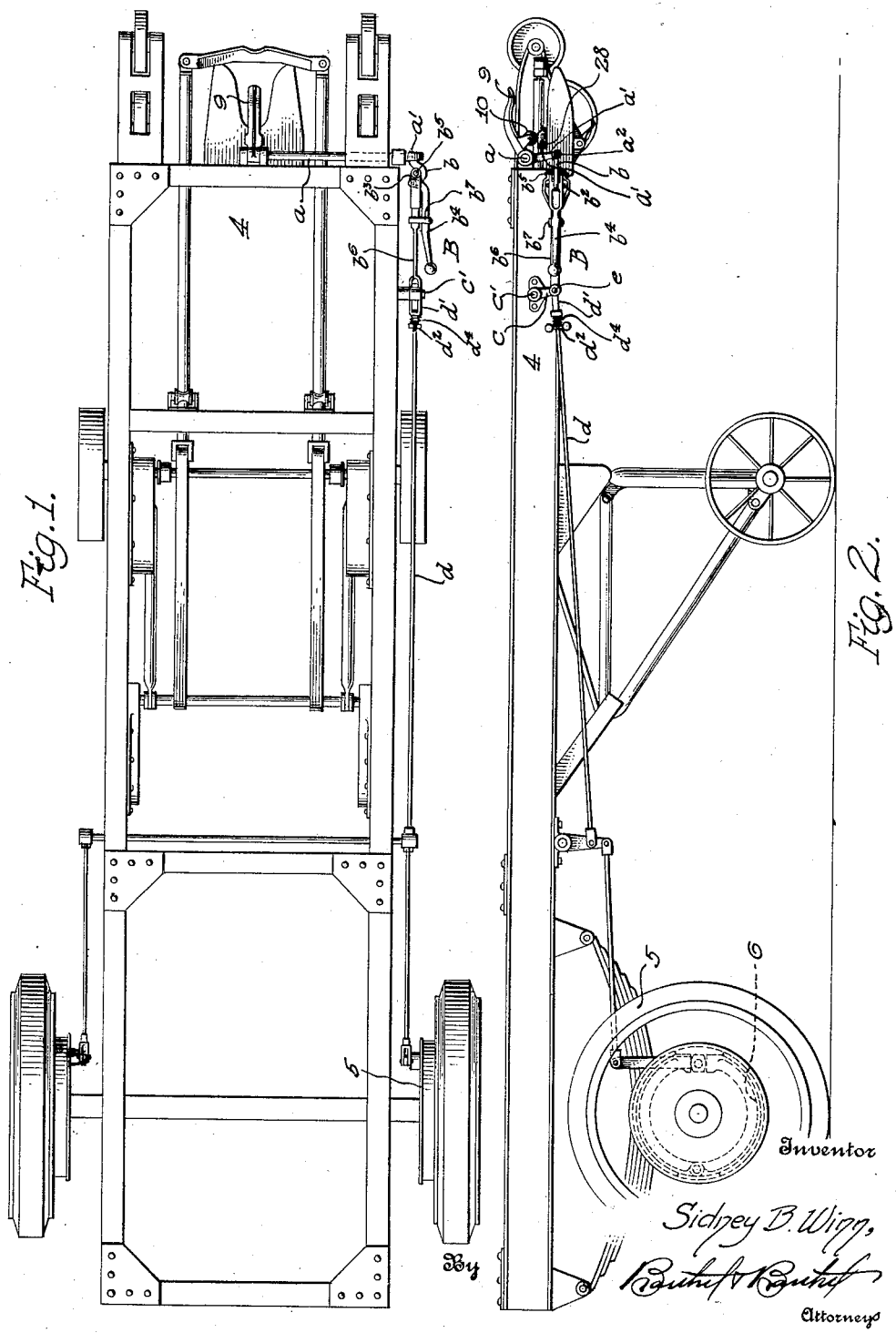
Inventor
Sidney B. Winn,
By
Attorneys March 11, 1930.  S. B. WINN  1,750,449
HAND BRAKE LEVER ASSEMBLY
Filed July 9, 1928   3 Sheets-Sheet 2
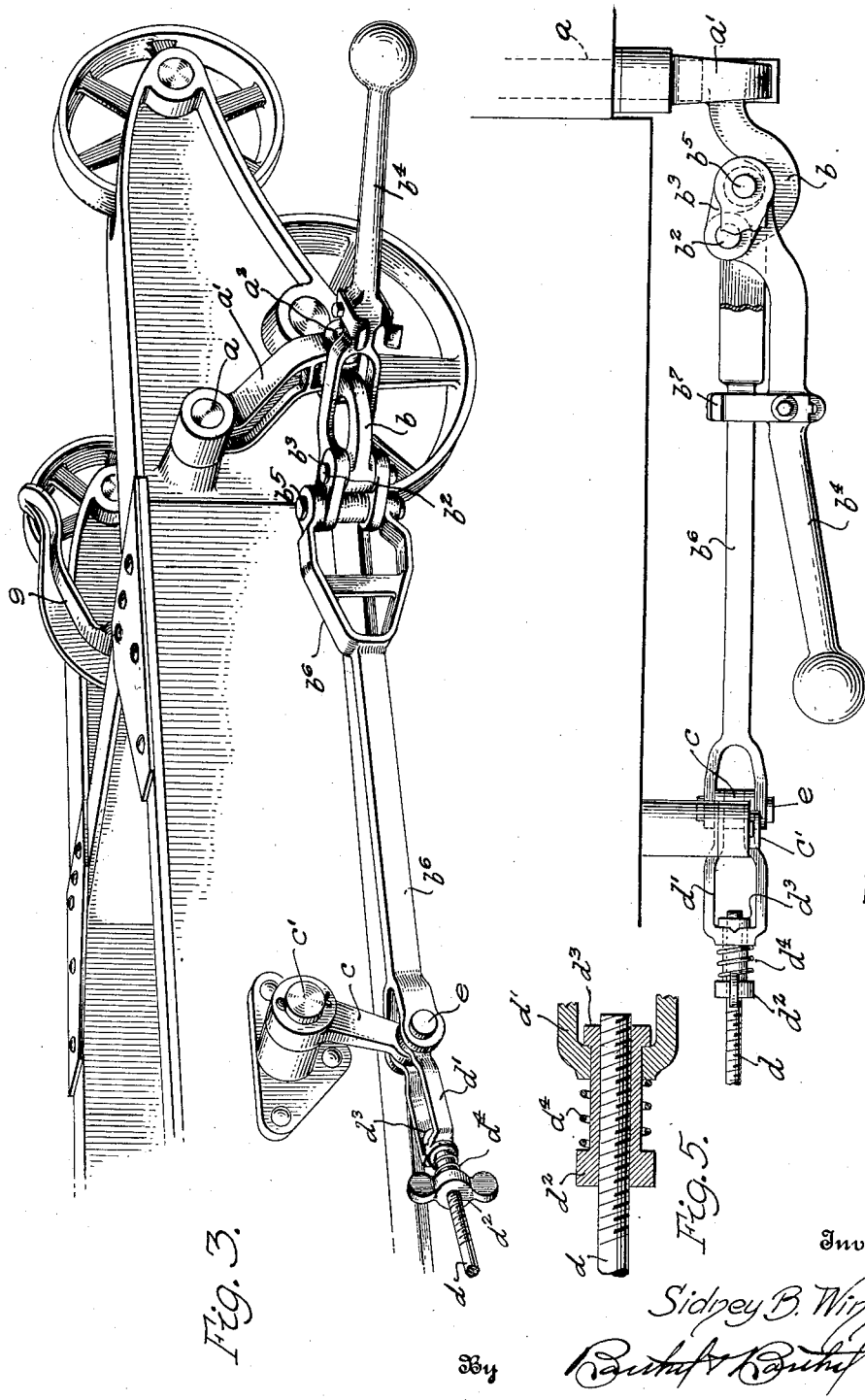
Inventor
Sidney B. Winn,
By
Attorneys

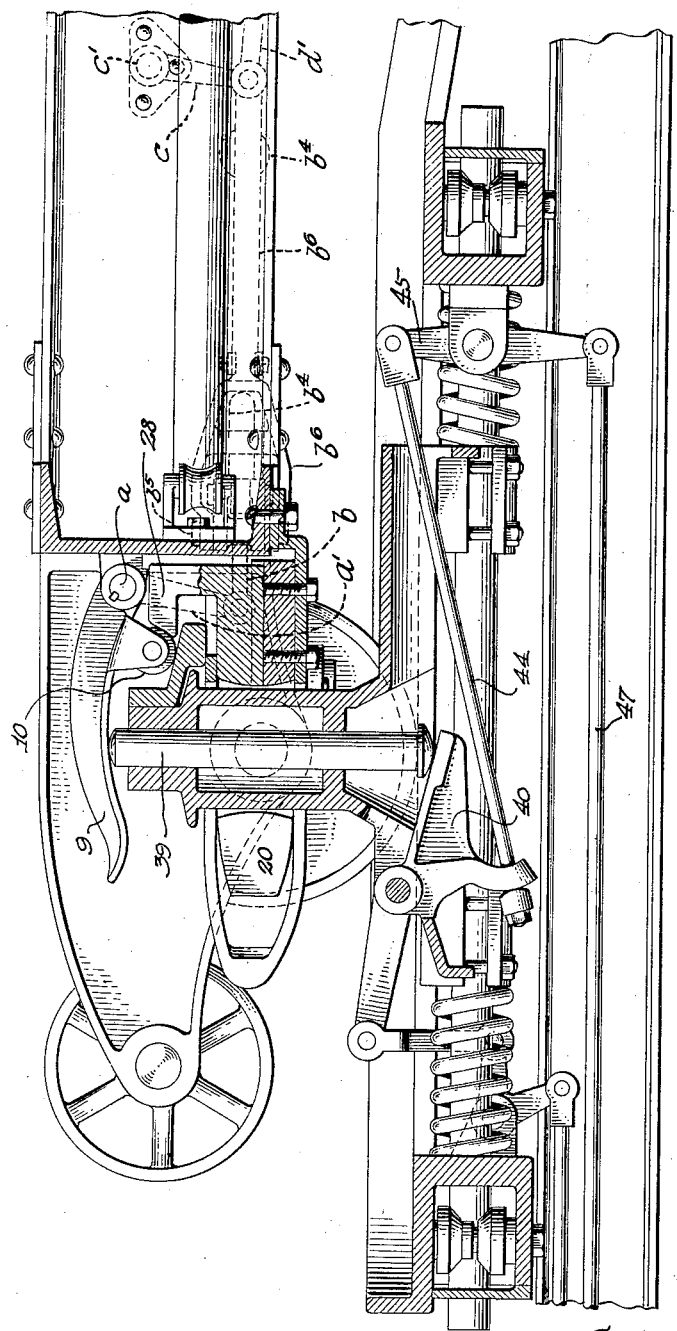

Patented Mar. 11, 1930

1,750,449

UNITED STATES PATENT OFFICE

SIDNEY B. WINN, OF LAPEER, MICHIGAN

HAND-BRAKE-LEVER ASSEMBLY

Application filed July 9, 1928. Serial No. 291,456.

This invention relates to improvements in brake operating mechanism for trailers, and pertains more particularly to mechanism designed to permit of temporary release of set brakes without affecting the general mechanism which is producing the brake-set condition.

In tractor-trailer combinations, as the art has developed, it is the general practice to apply brakes to the trailer with the operating connections such as to permit setting and release of the trailer brakes from the tractor, this arrangement being employed in the various types of combinations, including those in which the front end of the trailer is supported by the tractor for combined service operation, this type being generally known as "semi-trailers." In this latter type the modern development has provided for separation of tractor and trailer by relative movement of tractor and trailer in the direction of traction, and to provide efficient action under these conditions the connections have been such that the brakes of the trailer are set prior to or during the early part of the relative movement in order that efficient coupling and uncoupling action may take place; this is especially true in connection with the coupling operation, since the front end of the trailer, when separate from the tractor, is, in this particular type, generally located below the coupling plane and the coupling operation is effective to raise such front end into the coupling plane by backing the trailer—to provide efficient resistance of the trailer to set up relative movement under these conditions, it is the practice to have the brakes set so as to prevent the movement of the trailer away from the tractor as the latter is moving in a direction to raise the front end of the trailer.

To permit this result to be obtained, and to prevent failure of the operator to set up this resistance before completing the uncoupling action, the structures have been arranged to provide the set condition of the trailer brakes automatically—should the operator fail to set them manually prior to uncoupling—with the set condition maintained during the separated state of the trailer. But since it is often times desirable to shift the position of the separated trailer without the use of the tractor, provision has been made to permit of temporary release of the trailer brakes, with the structure capable of restoring the previous conditions, so that the trailer can be readily coupled when such action is desired. This latter is important since the coupling action is also designed to automatically restore the trailer brake mechanism to the control of the tractor operator, and it is therefore desirable that the parts be in proper position to produce this result.

The general idea in this connection can be readily understood from the disclosure of the patent granted to me August 11, 1925, No. 1,548,967, which discloses a general tractor-trailer combination of this type, and in which the brake operating mechanism includes a pin carried by the coupler head of the tractor and adapted to be reciprocated manually by the tractor operator, this pin co-acting with a pivoted shoe carried by the trailer, said shoe being a part of the brake operating mechanism permanently carried by the trailer and arranged so that the pivoted movements of the shoe, by the pin, moves the brake mechanism of the trailer to set or release the brakes. The arrangement is such that when relative movement of tractor and trailer takes place in uncoupling, the shoe will be moved to the brake-set position (if the operator has not done this manually) and maintained in such position until coupling again takes place. To provide for temporary release of the brakes, and to adjust for wear, the shoe, in the particular instance referred to, is operatively connected to the brake mechanism by a pawl and ratchet connection which permits of adjustment between the shoe and operating mechanism, such adjustment enabling the brakes to be released without disturbing the set position of the shoe itself, so that by restoring the position of the pawl and ratchet, the parts will be in position to be recoupled with the tractor with the shoe in proper position.

This same general arrangement is also disclosed in the patent granted to me February 28, 1928, No. 1,660,946, in which the coupling mechanism differs from that of the earlier disclosure, as does the mechanism which is employed for automatically moving the shoe to its brake-set position, this latter patent disclosing different arrangements for producing the result. The temporary release feature, however, is generally similar to that of the disclosure of the earlier patent. These two patents are referred to as representative of a number of other disclosures of patents granted to me at different times, and in which this general arrangement is to be found.

In these various disclosures, the pawl and ratchet characteristic is provided by a toothed sector mounted to move with the shoe, and a brake lever mounted on a shaft of the brake operating mechanism of the trailer, the pawl being carried by the lever and co-operating with the teeth of the sector. The arrangement thus has the characteristics of a brake operating lever carried by the trailer with the shoe operatively connected with the brake lever so as to operate the latter from the tractor, the sector of the shoe functioning somewhat as the sector of the brake operating mechanism found in the cab of the tractor, but being movable with the shoe when the tractor and trailer are coupled; when the shoe is held automatically in the brake-set position during separation of the trailer, the sector becomes fixed in position, and thus permits the brake lever to be operated as a hand lever brake without disturbing the position of the shoe, so that the latter is in proper position for the coupling operation.

This arrangement is completely efficient, having but the one disadvantage of location. Since the shoe must be operative at the upper end of the coupling zone, and therefore at a point on the trailer that is a considerable distance from the ground, and the lever is in proximity to it and necessarily of considerable length to permit of the desired leverage to restore the brake set condition manually, the arrangement places the operating handle of the brake lever at a considerable distance from the ground making it somewhat awkward to operate by a person standing on the ground. Since the trailer is stationary when the lever is operated, this condition provides no serious difficulty, since, if necessary, the operator can readily place himself in position to provide the operation. One other possibility present as a possible difficulty, although it has not been encountered in actual service, is brought about by the fact that in this arrangement, the pawl, when raised from the sector, completely disconnects the shoe from the brake operating mechanism of the trailer, so that should pawl raising take place while the tractor and trailer are coupled, the disconnection of the shoe from the operating mechanism could take the trailer brakes away from the control of the tractor operator. In practice and service, such condition has not been encountered, since the pawl is generally spring-supported, in addition to which its location above the sector teeth normally maintains engagement through gravity; but there is a remote possibility of disengagement under abnormal operation or breakage of parts, and this would be accentuated should the attempt be made to change the position of the lever to a more accessible point by operating the lever in a horizontal rather than in the vertical plane in which it is being used—operating in a horizontal plane would eliminate the protection afforded by the gravity action of the pawl to maintain the connection.

The present invention is designed to meet these conditions by shifting the position of the temporary release mechanism from the position above the coupling structure to a position at the side of the trailer chassis, a change which provides for lever movement in a horizontal plane; and the possibility of a break in the brake-operating mechanism under abnormal conditions is provided by arranging the release mechanism as a permanent part of the brake-operating mechanism—at no period in the operation of the release mechanism is there a disconnection of parts such as to break the connection between the shoe and the brake structure.

To these and other ends, therefore, the nature of which will be readily understood as the invention is hereinafter disclosed, said invention consists in the improved construction and combination of parts, hereinafter fully described, illustrated in the accompanying drawings, and more particularly pointed out in the appended claims.

In the accompanying drawings, in which similar reference characters indicate similar parts in each of the views,—

Figure 1 is a top plan view of a trailer structure in which the present invention is shown applied, the release mechanism being shown in its normal or non-release position.

Fig. 2 is a side elevation of the structure shown in Fig. 1, with certain of the parts omitted for the purpose of clearness.

Fig. 3 is a perspective view on an enlarged scale, showing the release mechanism, with the latter shown in its brake-released position.

Fig. 4 is a top plan view of the brake-release mechanism with parts broken away.

Fig. 5 is a detail sectional view of the take-up mechanism.

Fig. 6 is a detail sectional view of the coupling zone of one type of tractor-trailer combination to which the invention may be applied.

For the purpose of illustrating the general purpose of the present invention, I have shown, in Fig. 6, a view corresponding generally to that disclosed in Patent No. 1,660,946 (Fig. 4), the same being modified in accordance with the present invention. A detailed description of the structure is not given, as that is to be found within the patent, it being sufficient to state that the tractor and trailer are coupled by a pair of knuckles engaging a king-pin formation carried by the tractor, the front end of the trailer having a pair of wheels spaced from the coupling zone and resting on a track carried by the tractor to provide the action of a fifth-wheel connection, the track having rearwardly and downwardly extending ramp-like ways over which the wheels are adapted to travel when tractor and trailer are being moved between coupled and separated positions by relative movement of tractor and trailer in the direction of traction. Included within the structure is a movable front support for the trailer, which is moved between active and inactive positions during relative movement of tractor and trailer, the king-pin having a function in the control of these support movements.

The brake-operating structure of the tractor is shown in the form of the pin 39 adapted to be reciprocated vertically within the king-pin by the bell-crank lever 40, connection 44, lever 45 and connection 47, the latter leading to and being operated by a suitable brake lever in the cab of the tractor. The shoe 9 is carried by the trailer, being carried by a transverse shaft $a$, being distinguished from the patent disclosure in that the shoe is fixed to the shaft instead of being loose thereon, the pawl and sector arrangement of the patent disclosure being omitted. The shoe carries roller 10, which is adapted to co-operate with a member 28 of the coupling to automatically set the trailer brakes when the tractor and trailer have the relative movement during the uncoupling operation. In this latter operation, member 28—articulated with the coupling knuckles 20—is advanced, thus raising the shoe, the roller passing on to the upper face of member 28; since member 28 retains this position until the tractor and trailer are again brought to coupling position (member 28 is moved backward by the coupling operation to release the roller) it will be readily understood that when member 28 is actively supporting the roller, shaft $a$ will be held from movement in a direction to release the brakes, since shoe 9 is held from movement in this direction. In the patent disclosure, the shaft may be released without affecting the position of the shoe, due to the pawl and sector connection between them; in the present development, the shaft $a$ and shoe operate together at all times.

It will be understood, of course, that the particular coupling structure of Fig. 6 is presented for illustrative purposes only, being one of a number of structures which have been employed, and in which some form of the shoe 9 and a means for maintaining it set when the trailer is separated from the tractor, is employed. In each of these a reciprocating pin is employed to operate the shoe from the tractor during combined service operation, and some form of release mechanism is employed—within the trailer brake connections—by which the brakes may be released temporarily when the shoe is being held in its brake-set position.

As in the earlier structure, the trailer has the usual rear axle assembly or truck 5 provided with a brake mechanism 6 which is operatively connected with shaft $a$, but the connections between the brake mechanism and the shaft are modified, although the connection itself, as in the patent disclosure, is located at the side of the frame which forms the forward end 4 of the trailer. The modification consists fundamentally in providing a length-varying device within the connections between the shaft and brake mechanism, in substitution for the make and break arrangement (the pawl and sector) between the shaft and shoe of the patent.

The length-varying device, indicated generally at B, is located between the end of a lever $a'$ carried by and secured to shaft $a$, and a lever $c$ mounted on a stub-shaft $c'$ carried at the side of frame 4, the connection $d$, which leads from the brake mechanism 6 being connected to the free end of lever $c$, the connection including a take-up structure formed of a member or sleeve $d'$ pivoted on a pin $e$ carried by lever $c$, member $d'$ carrying a nut-like member $d^2$ threaded on to the threaded end of connection $d$, member $d^2$ thus operatively connecting the connection $d$ with member $d'$, the connection, however, permitting relative movement in the direction of length of rod or connection $d$, the movement in one direction being controllable through the threaded connection between $d$ and $d^2$, the movement in the other direction being free through the smooth connection between $d'$ and $d^2$, the latter having a head $d^3$ which forms an abutment co-operating with member $d'$ in preventing free movement in the opposite direction. The free movement is under the restraint of a spring $d^4$, and head $d^3$ and member $d'$ preferably have co-operating means to normally retain member $d^2$ from its threading movement, this means being illustrated by a tooth and recess formation, this being one of a number of ways in which to produce this result.

As will be understood, if lever $c$ is drawn forwardly, member $d'$ will draw the rod $d$ through the action of head $d^3$. By shifting the position of member $d^2$ on rod $d$ the wear in the brake-bands can be readily taken up, and the desired brake pressure controlled in a simple manner. Should lever $c$ be moved backward an excessive distance, the relative movement permitted between members $d'$ and $d^2$ will permit the lever movement without the necessity of providing an abnormal length of movement of the brake-mechanism itself in moving between applied and released positions.

The length-varying device is located between levers $a'$ and $c$, and specifically between a pin $a^2$ carried by lever $a'$ and pin $e$. This device includes a curved member $b$ mounted on pin $a^2$, and which has its rear end carrying a vertical pin $b^2$ on which are mounted the arms or ends $b^3$ of a lever $b^4$, the latter being forked to provide a space through which member $b$ extends. The position of pin $b^2$ in the arms $b^3$ is away from the free end of these arms, such ends $b^3$ carrying a second pin $b^5$ to which the forward end of a connecting member $b^6$ is secured, such forward end being bifurcated to form arms lying outside of the ends $b^3$. The rear end of connection $b^6$ is carried by pin $e$.

The length-varying action is provided by the movement of lever $b^4$. As will be understood, either pin $b^2$ or pin $b^5$ could serve as the axis of lever movement, pin $b^2$ preferably being employed, since the purpose, generally, of the device, would cause it to become active to increase the length of the connections at a time when shoe 9 is in its elevated position through the activity of member 28, so that further movement of lever or arm $a'$ in an advancing direction is more or less inapplicable. By employing pin $b^2$ as the axis of lever movement, the ends $b^3$ are swung to carry pin $b^5$ to one side of pin $b^2$—as indicated in Fig. 3—thus moving connection $b^6$ rearwardly and swinging lever $c$ in a corresponding direction to release the brakes. A movement of the lever in the opposite direction returns pin $b^5$ to the position shown in Fig. 4, thus returning the brakes to applied position. As will be seen from Fig. 4, the movement of pin $b^5$ between these positions, serve to carry it from one side to the other of a line drawn between levers $a'$ and $c$ and which extends through pin or pivot $b^2$, the position in Fig. 4 being such that the pull of lever $a'$ applied on pin $b^2$ would tend to move lever $b^4$ inward; since the structure prevents this, such pull is communicated to pin $b^5$ and serves to draw the connection $b^6$ forwardly. This is the movement of greatest stress—the movement which applies the brakes—and hence the structure provides a locked formation against any yielding action at such time. Movement of lever $a'$ rearwardly would tend to reverse the conditions, but this is the movement which releases the brakes and hence does not provide a heavy pressure on the lever. To prevent the lever $b^4$ yielding at such time, the lever is provided with one or more spring fingers $b^7$ which engage connection $b^6$, when the parts are in the position of Fig. 4, these fingers being readily released when the operator desires to shift the position of the lever from that of Fig. 4 to that of Fig. 3.

The length variation is due to the fact that when the parts are in the position of Fig. 4, levers $a'$ and $c$ will have a definite distance relation, which is maintained irrespective of the movement of lever $a'$ as the position of shoe 9 is shifted through the movements of pin 39, the position of the parts of the device relative to each other and the levers remaining constant. When, however, lever $b^4$ is moved to the position of Fig. 3, the shift in position of the pins $b^2$ and $b^5$ relatively to each other, will serve to shift either lever $a'$ or lever $c$, or both, with the shifting such as to increase the distance between pins $a^2$ and $e$, thus increasing the distance between pin $a^2$ and the brake mechanism; since the brakes are held applied only through the action of the connections, it will be readily understood that when this distance between pins $a^2$ and $e$ is increased, the brakes will be released without affecting the position of lever $a'$, being restored to applied position, when the distance between pins $a^2$ and $e$ is again brought to the normal distance by return of the lever to the position of Fig. 4.

As will be understood, there is no break in the connections between levers $a'$ and $c$ at any time during this operation—the connection remains positive and complete; hence, the shoe 9 is permanently connected with the brake mechanism, and, at the same time, the connections are such that the brake mechanism may be released at will without requiring a change in the position of the shoe. And since the lever movements are in a horizontal plane, with the lever located so as to be readily accessible to an operator located on the ground, it will be readily understood that whenever it is desired to shift the position of the separated trailer, the temporary release of the brakes can be provided without difficulty, and without affecting any of the conditions within the coupling zone, so that the shoe, etc., located in such zone, retain their positions ready for the connection with the tractor. Since the lever, in the position of Fig. 3 extends outwardly a considerable distance, it affords visual evidence that the trailer brakes are not applied, and the operator's attention is thus called to this fact, permitting a proper restoration to service conditions, by simply moving the lever $b^4$ to its locked position—the position of Fig. 4.

One of the advantages of the arrangement flows through the fact that the operator does not change any relationship of parts such as would set up a difference in brake pressure when the parts are restored to service condition. In the structure of the patent disclosure, the shifting of the lever changes the relation between the shoe and the shaft, and this can be restored to its former condition by locating the pawl in the same notch of the sector when the lever is returned; unless the operator has noted the notch in advance, and is careful to return the pawl to this notch, it is possible to vary the brake pressure inadvertently. With the present arrangement this is not possible, since the return of the lever $b^4$ will restore the previous conditions. And the tell-tale characteristic provided by the position of the lever $b^4$ when the brakes are released, is of advantage, since a change in the position of the lever of the patent disclosure is not readily discerned unless its release movement had been intentionally extended to set up such an abnormal position as to be clearly apparent; to produce such an exaggerated condition would entail a lengthy movement at the brake mechanism; in the present arrangement, the length of movement of the lever $b^4$ to its outer position does not affect the brake mechanism, since the permissible yield between members $d'$ and $d^2$ permits such lever movement without affecting the brake mechanism.

As will be understood, the connected relationship of parts is maintained from the shoe 9 to the brakes, regardless of the position of lever $b^4$ this relationship remaining unbroken at all times, the temporary release of brakes being provided by lengthening of the connections between brakes and shoe rather than providing a break in the connections, as in the earlier arrangement. And while this connected relationship is thus maintained, thereby providing for control of the brakes by the shoe when the lever is in its normal position, the presence of such relationship does not prevent the temporary release of control by the shoe, since the release mechanism is itself a part of the connections and functions to produce the release result by varying the length of the connections which still retain the connected relationship.

It will be understood, of course, that in the particular embodiment disclosed the connections are so arranged that the temporary release mechanism is directly connected with lever $a'$, thus locating the lever $b^4$ adjacent the front end of the trailer chassis. As will be obvious, the position of this release mechanism may be moved rearwardly by shortening rod $d$ and interposing a rod connection between lever $a'$ and member $b$. Similarly, the location of the take-up structure may be varied, the position shown being a convenient one, and especially effective in the particular arrangement which is disclosed.

While I have herein shown and described a preferred form in which the present invention may be embodied, it will be readily understood that changes and modifications therein may be found desirable or essential in meeting the various exigencies of service conditions, and I desire it to be understood that I reserve the right to make any and all such changes and modifications as may be found desirable or necessary, in so far as the same may fall within the spirit and scope of the present invention as expressed in the accompanying claims when broadly construed.

Having thus described the invention, what I claim as new is:

1. In tractor-trailer combinations of the semi-trailer type, wherein the tractor and trailer have a coupling relationship to permit combined and separate service activity, wherein the trailer is under brake control from the tractor during combined service activity, and wherein separation of tractor and trailer is operative to automatically apply the trailer brakes in brake-set condition, brake mechanism for and carried by the trailer, said mechanism including an element manipulable from the tractor to provide trailer brake movements during combined service activity, and connections between said element and the trailer brakes for translating element movements to the brakes of the trailer, said element, brakes and connections forming a unitary mechanism in constant connected relationship, said connections including a pair of pivoted supporting arms located in fore and aft relation and connected to move in unison, a section in advance of and connected to the fore support, and means within the section for temporarily releasing the brakes from element control while maintaining said connected relationship and while maintaining the brake-set position of the element.

2. Brake mechanism as in claim 1 characterized in that the connection in rear of the fore supporting arm also includes adjustable take-up means.

3. Brake mechanism as in claim 1 characterized in that the temporary-release means is positioned at the side and external of the trailer chassis.

4. Brake mechanism as in claim 1 characterized in that the temporary-release means is active to normally maintain a definite length characteristic to the section and to increase the length of such section during the temporary-release condition.

5. Brake mechanism as in claim 1 characterized in that the temporary-release means includes a pair of members operatively connected by a lever for relative pivotal movements, with the pivot points relatively arranged so that lever movements between a normal and a temporary-release position are operative to vary the length of the section, whereby the lever in its normal position will maintain the brakes subject to element movement and will release the brakes from element control when the lever is shifted to temporary-release position.

6. Brake mechanism as in claim 1 characterized in that the temporary-release means includes a pair of members operatively connected by a lever for relative pivotal movements, with the pivot points relatively arranged so that lever movements between a normal and a temporary-release position are operative to vary the length of the section, said lever being movable in a substantially horizontal plane.

7. Brake mechanism as in claim 1 characterized in that the temporary-release means includes a pair of members operatively connected by a lever for relative pivotal movements, with the pivot points relatively arranged so that lever movements between a normal and a temporary-release position are operative to vary the length of the section, said lever being movable in a substantially horizontal plane, the temporary-release position of the lever being such as to cause the lever to constitute an effective visual signal of the unset condition of the brakes.

8. Brake mechanism as in claim 1 characterized in that the temporary-release means includes a pair of members operatively connected by a lever for relative pivotal movements, with the pivot points relatively arranged so that lever movements between a normal and a temporary-release position are operative to vary the length of the section, the pivot point locations being such that movement of the lever between its positions causes movement of a pivot from one side to the other of the draft line of the means, whereby the lever will be normally maintained locked against release movement with the locked condition releasable at will by lever movement to temporary-release position.

9. Brake mechanism as in claim 1 characterized in that the forward end of the temporary-release means section is carried by a lever pivotally mounted on the chassis of the trailer, with one of the levers and operatively connected with the element.

In testimony whereof I affix my signature.

SIDNEY B. WINN.